US012552398B2

(12) United States Patent
Oe et al.

(10) Patent No.: US 12,552,398 B2
(45) Date of Patent: Feb. 17, 2026

(54) FAILURE NOTIFICATION SYSTEM

(71) Applicants: TOYOTA JIDOSHA KABUSHIKI KAISHA, Toyota (JP); Nomura Research Institute, Ltd., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 66 days.

(21) Appl. No.: 18/655,893

(22) Filed: May 6, 2024

(65) Prior Publication Data

US 2024/0416930 A1 Dec. 19, 2024

(30) Foreign Application Priority Data

Jun. 15, 2023 (JP) .................................. 2023-098677

(51) Int. Cl.
| | |
|---|---|
| *B60W 50/02* | (2012.01) |
| *B60W 50/14* | (2020.01) |
| *G06V 20/58* | (2022.01) |
| *H04W 4/46* | (2018.01) |

(52) U.S. Cl.
CPC ........ *B60W 50/0205* (2013.01); *B60W 50/14* (2013.01); *G06V 20/584* (2022.01); *H04W 4/46* (2018.02); *B60W 2050/021* (2013.01); *B60W 2050/143* (2013.01); *B60W 2050/146* (2013.01); *B60W 2420/403* (2013.01); *B60W 2556/65* (2020.02)

(58) Field of Classification Search
CPC ............ B60W 50/0205; B60W 50/14; B60W 2556/65; B60W 2050/021; B60W 2050/143; B60W 2050/146; B60W 2420/403; H04W 4/46; G06V 20/584
See application file for complete search history.

(56) References Cited

U.S. PATENT DOCUMENTS

| | | | |
|---|---|---|---|
| 2021/0331691 A1* | 10/2021 | Ham | G06V 20/56 |
| 2023/0239438 A1* | 7/2023 | Kim | G06V 10/95 |
| | | | 701/300 |

FOREIGN PATENT DOCUMENTS

JP 2018-200456 A 12/2018

* cited by examiner

*Primary Examiner* — Naeem Taslim Alam
(74) *Attorney, Agent, or Firm* — Sughrue Mion, PLLC

(57) ABSTRACT

A failure notification system mounted on a vehicle includes an imaging device, a processing device, and a transmission device. The processing device acquires video data of a preceding vehicle captured by the imaging device. The processing device performs failure determination based on the acquired video data. As a result of the failure determination by the processing device, when a failure of a brake light of the preceding vehicle is detected, the processing device causes the transmission device to transmit information indicating that the brake light is failed to a reception device of the preceding vehicle.

4 Claims, 3 Drawing Sheets

FAILURE NOTIFICATION SYSTEM

CROSS-REFERENCE TO RELATED APPLICATION

This application claims priority to Japanese Patent Application No. 2023-098677 filed on Jun. 15, 2023, incorporated herein by reference in its entirety.

BACKGROUND

1. Technical Field

This disclosure relates to a failure notification system.

2. Description of Related Art

Japanese Unexamined Patent Application Publication No. 2018-200456 (JP 2018-200456 A) discloses a failure notification device. The failure notification device notifies a driver that a brake light is burnt out.

SUMMARY

The brake light mounted on a vehicle enables safe driving by informing a following vehicle that the vehicle is decelerating. Therefore, the driver must maintain the vehicle to ensure that the brake light is always functioning properly. However, it is difficult for the driver to notice that the brake light of the vehicle that the driver is driving is failed.

Hereinafter, means for solving the above issue and actions and effects thereof will be described.

A failure notification system for solving the above issue is mounted on a vehicle and includes an imaging device, a processing device, and a transmission device. In the failure notification system, the processing device determines video of a preceding vehicle captured by the imaging device, and detects a failure of a brake light of the preceding vehicle. When the processing device detects the failure of the brake light of the preceding vehicle, the processing device causes the transmission device to transmit information indicating that the brake light is failed to a reception device of the preceding vehicle.

The failure notification system can notify the driver of the preceding vehicle that the brake light is failed. As a result, the driver of the preceding vehicle can easily notice that the brake light is failed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a failure notification system will be described below with reference to FIGS. 1 to 4.

Configuration of Failure Notification System 100

Figure 1:
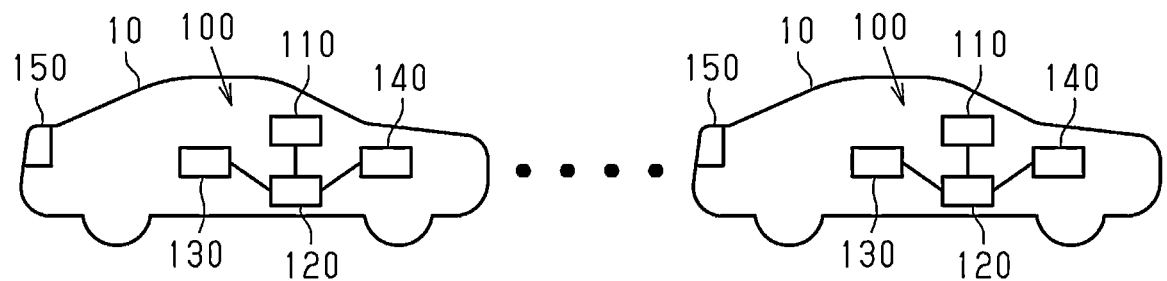
FIG. 1 is a schematic diagram showing a configuration of a failure notification system according to an embodiment.

As shown in FIG. 1, the failure notification system 100 is mounted on each of a plurality of vehicles 10. The failure notification system 100 includes an imaging device 110, a processing device 120, a transmission-reception device 130, and a notification device 140.

Figure 2:
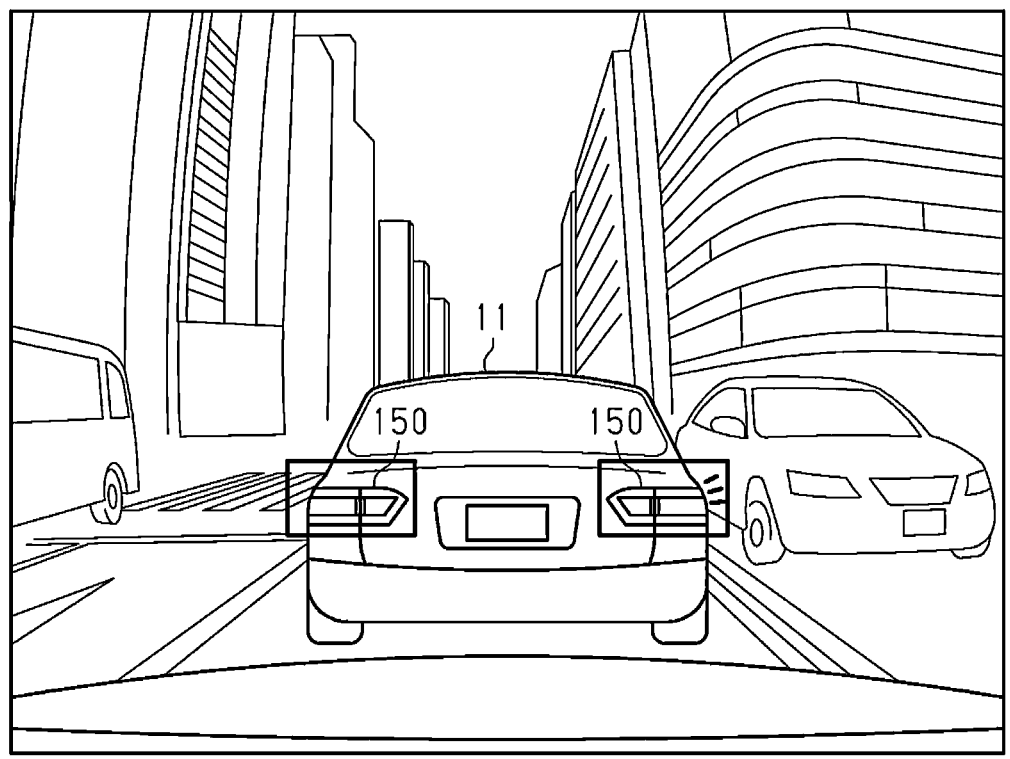
FIG. 2 is a diagram showing an example of an image captured by an imaging device of the failure notification system according to the embodiment.

FIG. 2 shows an example of video captured by the imaging device 110. The imaging device 110 captures the video of an area in front of the vehicle 10, as shown in FIG. 2.

The imaging device 110 and the processing device 120 are connected to each other in order to exchange video data. The processing device 120 can acquire the video data captured by the imaging device 110.

The transmission-reception device 130 and the processing device 120 are connected to each other in order to exchange information. The transmission-reception device 130 performs inter-vehicle communication to exchange information with surrounding vehicles 10.

The notification device 140 and the processing device 120 are connected to each other in order to exchange information. The notification device 140 performs notification to a driver by sound, display, and the like. The processing device 120 causes the notification device 140 to execute the notification by transmitting a signal to the notification device 140.

Processing Executed by Processing Device 120 Included in Failure Notification System 100

Figure 3:
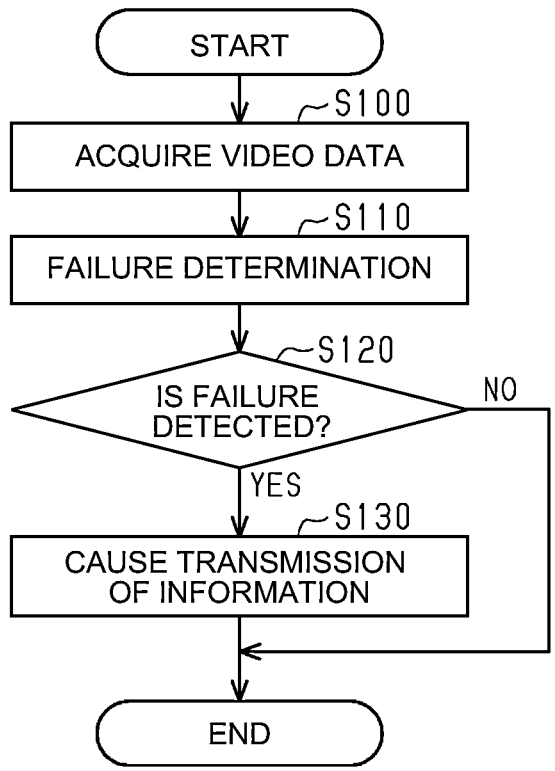
FIG. 3 is a flowchart showing a flow of processing executed by a processing device when the processing device included in the failure notification system of the embodiment acquires video data of a preceding vehicle.

FIG. 3 shows a flow of a series of processes executed in inter-vehicle communication. The series of processes is executed by the processing device 120 of the vehicle 10. The series of processes is executed when the imaging device 110 captures the video of a preceding vehicle 11 as shown in FIG. 2. Among a plurality of the vehicles 10, the preceding vehicle 11 is a vehicle that is traveling in front of the vehicle 10 on which the processing device 120 that is executing the series of processes is mounted.

As shown in FIG. 3, when the series of processes is started, the processing device 120 first acquires the video data of the preceding vehicle 11 captured by the imaging device 110 in a process in step S100.

Next, in a process in step S110, the processing device 120 performs failure determination based on the acquired video data of the preceding vehicle 11. Specifically, the processing device 120 uses image recognition to perform the failure determination of a brake light 150 of the preceding vehicle 11. In the failure determination, the processing device 120 first recognizes the brake light 150 of the preceding vehicle 11 by the image recognition from the video of the preceding vehicle 11 captured by the imaging device 110. In FIG. 2, a position of the recognized brake light 150 of the preceding vehicle 11 is shown surrounded by a solid line. The processing device 120 determines, when only one of the recognized left brake light 150 and right brake light 150 is lit, that the brake light 150 of the preceding vehicle 11 is failed. FIG. 2 shows a state in which only a right brake light 150 is lit.

In a process in step S120, the processing device 120 determines whether the failure of the brake light 150 of the preceding vehicle 11 has been detected through the failure determination. When the failure is detected (step S120: YES), the process advances to step S130.

In a process in step S130, the processing device 120 causes the transmission-reception device 130 to transmit the information indicating the failure. Specifically, the processing device 120 causes the transmission-reception device 130 to transmit the information indicating the failure to the transmission-reception device 130 of the preceding vehicle 11.

In this way, the transmission-reception device 130 transmits the information indicating the failure to the transmission-reception device 130 of the preceding vehicle 11, thereby ending the series of processes.

In the process in step S120, when the processing device 120 determines that the failure of the brake light 150 of the preceding vehicle 11 is not detected (step S120: NO), the processing device 120 does not execute the process in step S130 and ends the series of processes. That is, when the failure is not detected, the processing device 120 ends the series of processes without causing the transmission-reception device 130 to transmit the information to the transmission-reception device 130 of the preceding vehicle 11.

Figure 4:
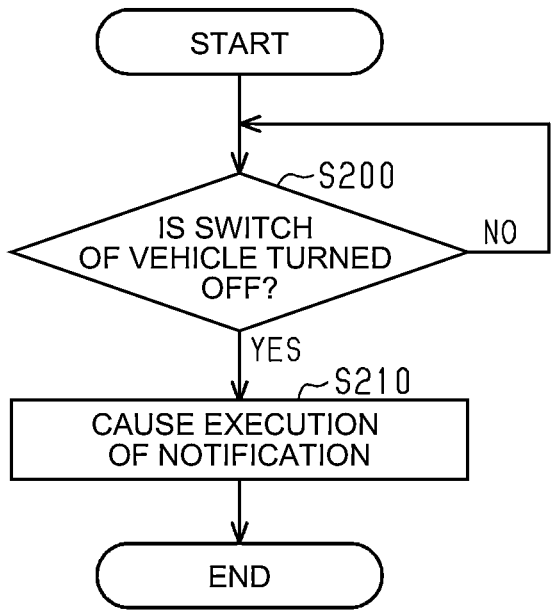
FIG. 4 is a flowchart showing a flow of processing executed by the processing device when a reception device included in the failure notification system of the embodiment receives information indicating a failure.

Processing Executed by Processing Device 120 when Information Indicating Failure is Received FIG. 4 shows the flow of the series of processes executed by the processing device 120 when the information indicating failure is received. The series of processes is executed by the processing device 120 of the vehicle 10 when the transmission-reception device 130 receives the information indicating the failure.

As shown in FIG. 4, when the series of processes is started, the processing device 120 first determines whether a switch of the vehicle 10 is turned OFF in a process in step S200. When the switch of the vehicle 10 is turned ON (step S200: NO), the process in step S200 is repeated. When the switch of the vehicle 10 is turned OFF (step S200: YES), the process advances to step S210.

In a process in step S210, the processing device 120 transmits the signal to the notification device 140. The notification device 140 that has received the signal executes the notification that the brake light 150 is failed.

In this way, the processing device 120 causes the notification device 140 to execute the notification to notify the driver that the brake light 150 is failed, thereby ending the series of processes.

Operations of Present Embodiment

In the failure notification system 100, the imaging device 110 captures the video of the preceding vehicle 11.

Next, the processing device 120 causes the transmission-reception device 130 to transmit the information indicating the failure to the transmission-reception device 130 of the preceding vehicle 11 through the series of processes described with reference to FIG. 3.

Then, the transmission-reception device 130 of the preceding vehicle 11 receives the transmitted information indicating the failure.

Further, the processing device 120 of the preceding vehicle 11 causes the notification device 140 to execute the notification that the brake light 150 is failed through the series of processes described with reference to FIG. 4.

Effects of Embodiment (1) The processing device 120 of the failure notification system 100 acquires the video data of the preceding vehicle 11 captured by the imaging device 110 while the vehicle 10 is traveling. The processing device 120 determines, based on the acquired video data, whether the brake light 150 of the preceding vehicle 11 shown in the video is failed. When the failure is detected, the transmission-reception device 130 transmits the information indicating that the brake light 150 is failed to the transmission-reception device 130 of the preceding vehicle 11. As a result, the failure notification system 100 can notify the driver of the preceding vehicle 11 that the brake light 150 is failed. As a result, the driver of the preceding vehicle 11 can easily notice that the brake light 150 is failed.

(2) The failure notification system 100 includes the notification device 140. When the transmission-reception device 130 receives the information that indicates the failure of the brake light 150 and that is transmitted to the transmission-reception device 130, the processing device 120 causes the notification device 140 to execute the notification that the brake light 150 is failed. The notification makes it easier for the driver to notice the failure of the brake light 150 of the vehicle 10 that the driver is driving. That is, with the failure notification system 100, the driver can notify the preceding vehicle 11 with the failed brake light 150 that the brake light 150 is failed. In addition, the failure notification system 100 allows the driver to receive the notification from another vehicle 10 that the brake light 150 of the vehicle 10 that the driver is driving is failed.

(3) The processing device 120 of the failure notification system 100 determines whether the switch of the vehicle 10 is turned OFF. Even when the information indicating that the brake light 150 is failed is received, while the switch of the vehicle 10 is turned ON, the processing device 120 does not cause the notification device 140 to execute the notification that the brake light 150 is failed. When the information indicating that the brake light 150 is failed is received and the switch of the vehicle 10 is determined to be turned OFF, the processing device 120 causes the notification device 140 to execute the notification that the brake light 150 is failed. The driver who is driving is concentrating on driving. Therefore, even when the notification is performed by the notification device 140 while the driving, the driver may miss the notification. The failure notification system 100 described above performs the notification when the switch of the vehicle 10 is turned OFF. In other words, the failure notification system 100 performs the notification when the driving has ended and when the driver is not driving. Therefore, a possibility that the driver will miss the notification can be reduced.

(4) The processing device 120 of the failure notification system 100 recognizes by the image recognition the right brake light 150 and the left brake light 150 of the preceding vehicle 11 from the video of the preceding vehicle 11 captured by the imaging device 110. The processing device 120 detects the failure of the brake light 150 of the preceding vehicle 11 when only the right brake light 150 is lit and when only the left brake light 150 is lit. When the brake light 150 is not failed, the right and left brake lights 150 are lit at the same time. When the brake light 150 is failed, only the right brake light 150 is lit, or only the left brake light 150 is lit. According to the above configuration, the failure notification system 100 can detect such a failure of the brake light 150 from the video.

Modifications

The present embodiment can be modified and implemented as follows. The present embodiment and the following modifications can be implemented in combination with each other within a technically consistent range.

The failure notification system 100 described above is equipped with the transmission-reception device 130 with functions of a transmission device and a reception device. Instead, the transmission device and the reception device may be separate devices.

The failure notification system 100 described above includes the imaging device 110, the processing device 120, the transmission-reception device 130, and the notification device 140. Instead, the failure notification system 100 may include the processing device 120, the transmission device, and the notification device 140, and the failure notification system 100 may be a system that only transmits the information indicating the failure.

The notification device 140 described above performs the notification when the switch of the vehicle 10 is turned OFF. Furthermore, the notification device 140 may also perform the notification when the transmission-reception device 130 receives the information indicating the failure.

The notification device 140 may perform the notification only when the transmission-reception device 130 receives the information indicating the failure, and does not need to perform the notification when the switch of the vehicle 10 is turned OFF.

Figure 5:
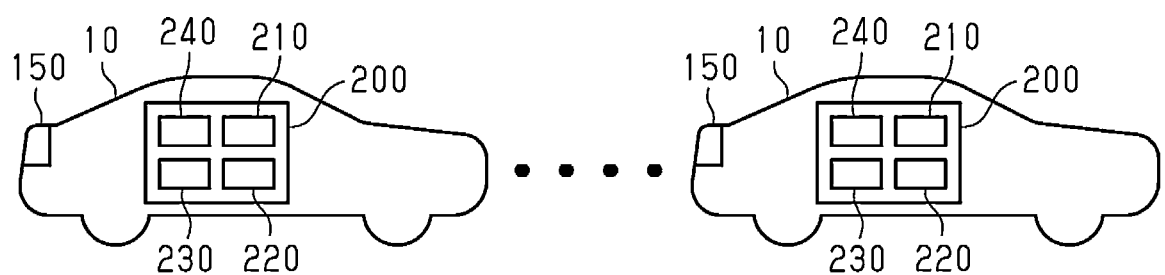
FIG. 5 is a schematic diagram showing a configuration of a failure notification system in a modification.

In the failure notification system 100 described above, the imaging device 110, the processing device 120, the transmission-reception device 130, and the notification device 140 are each mounted on the vehicle. Instead, as shown in FIG. 5, the failure notification system 100 may be configured as a driving recorder 200 including an imaging device 210, a processing device 220, a transmission-reception device 230, and a notification device 240. According to the failure notification system 100 configured as such a driving recorder 200, it becomes possible to perform the notification of the failure only by installing the driving recorder 200. Furthermore, even older vehicles that are not equipped with the failure notification system 100 can utilize the failure notification system 100 by installing the driving recorder 200.

What is claimed is:

1. A failure notification method for a vehicle, the failure notification method comprising:
   detecting, based on a preceding vehicle while the vehicle is traveling, a failure of a brake light of the preceding vehicle;
   causing, when the failure of the brake light of the preceding vehicle is detected, transmission of information indicating that the brake light is failed to the preceding vehicle; and
   causing, when the preceding vehicle receives the information that indicates the failure of the brake light, notification to a driver of the preceding vehicle that the brake light is failed.

2. The failure notification method according to claim 1, further comprising:
   determining whether a switch of the vehicle is turned OFF;
   when the information indicating that the brake light is failed is received, while the switch of the vehicle is turned ON, not causing the notification that the brake light is failed; and
   when the information indicating that the brake light is failed is received and the switch of the vehicle is turned OFF, causing the notification that the brake light is failed.

3. The failure notification method according to claim 1, further comprising recording the information indicating that the brake light is failed.

4. The failure notification method according to claim 1, further comprising detecting, based on the preceding vehicle, a right brake light and a left brake light of the preceding vehicle, and detecting the failure of the brake light of the preceding vehicle when only the right brake light is lit and when only the left brake light is lit.

* * * * *